United States Patent
Vourlat et al.

(10) Patent No.: US 9,537,990 B2
(45) Date of Patent: Jan. 3, 2017

(54) HOLDER DEVICE FOR PORTABLE ELECTRONIC APPARATUS, INNER STRUCTURE AND VEHICLE INCLUDING SUCH A DEVICE

(71) Applicant: FAURECIA INTERIEUR INDUSTRIE, Nanterre (FR)

(72) Inventors: Thierry Vourlat, L'Isle Adam (FR); Sébastien Jesus, Asnieres sur Seine (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/655,066

(22) PCT Filed: Oct. 24, 2013

(86) PCT No.: PCT/EP2013/072316
§ 371 (c)(1),
(2) Date: Jun. 24, 2015

(87) PCT Pub. No.: WO2014/102023
PCT Pub. Date: Jul. 3, 2014

(65) Prior Publication Data
US 2015/0350397 A1    Dec. 3, 2015

(30) Foreign Application Priority Data

Dec. 28, 2012 (FR) .................... 12 62948

(51) Int. Cl.
*H04M 1/00*    (2006.01)
*H04M 1/60*    (2006.01)
(Continued)

(52) U.S. Cl.
CPC ............ *H04M 1/6075* (2013.01); *B60R 11/02* (2013.01); *B60R 11/0235* (2013.01);
(Continued)

(58) Field of Classification Search
CPC .. B60R 11/02; B60R 11/0235; B60R 11/0241; B60R 2011/0005; B60R 2011/0075; B60R 2011/0084; B60R 2011/0094; G06F 1/1632; H04M 1/6075
(Continued)

(56) References Cited

U.S. PATENT DOCUMENTS

| 6,173,933 B1 * | 1/2001 | Whiteside ............... B60R 11/02 248/276.1 |
| 6,663,064 B1 * | 12/2003 | Minelli ................... B60R 11/00 248/187.1 |

(Continued)

FOREIGN PATENT DOCUMENTS

| FR | 2965527 A1 | 4/2012 | |
| KR | 20110040622 A | 4/2011 | |
| KR | 201110040622 A * | 4/2011 | ............... H02J 17/00 |

OTHER PUBLICATIONS

International Search Report for application No. PCT/EP2013/072316, dated Nov. 21, 2013, 2 pages.
(Continued)

*Primary Examiner* — Tan H Trinh
(74) *Attorney, Agent, or Firm* — Reising Ethington P.C.

(57) ABSTRACT

The holder device (3) according to the invention comprises:
a lower surface (21);
an upper part (25, 75);
a rear surface (23);
an electronic device (27), positioned near the rear surface (23).
The holder device (3) comprises a mechanism (26) for adjusting the separation between the lower surface (21) and the upper part (25, 75) as a function of the size of the electronic apparatus (5).

17 Claims, 5 Drawing Sheets

(51) Int. Cl.
*H04B 1/3877* (2015.01)
*B60R 11/02* (2006.01)
*G06F 1/16* (2006.01)
*B60R 11/00* (2006.01)

(52) U.S. Cl.
CPC ........ *B60R 11/0241* (2013.01); *G06F 1/1632* (2013.01); *H04B 1/3877* (2013.01); *B60R 2011/0005* (2013.01); *B60R 2011/0075* (2013.01); *B60R 2011/0084* (2013.01); *B60R 2011/0094* (2013.01)

(58) Field of Classification Search
USPC . 455/557, 573, 23, 575.1, 569.2; 296/37.12, 192, 193.02; 320/101, 114, 108, 320/109; 224/191, 483; 361/679.55; 248/183.1, 248/183.2, 221.1, 205.5, 187.1, 284.1, 415, 248/309.3, 276.1, 280.11, 205.1, 274.1, 346.04; 312/223.1; 310/339, 348
See application file for complete search history.

(56) References Cited

U.S. PATENT DOCUMENTS

| | | | | |
|---|---|---|---|---|
| 6,888,940 | B1* | 5/2005 | Deppen | B60R 11/0241 379/446 |
| 7,380,759 | B1* | 6/2008 | Whiteside | B60R 11/02 248/187.1 |
| 8,063,541 | B2* | 11/2011 | Winger | A45C 15/00 310/339 |
| 2006/0037713 | A1 | 2/2006 | Ichimaru et al. | |
| 2006/0239444 | A1* | 10/2006 | Piekarz | H04M 1/04 379/420.01 |
| 2008/0078793 | A1* | 4/2008 | Brown | B60R 11/0247 224/483 |
| 2008/0207279 | A1* | 8/2008 | Piekarz | B60R 11/0241 455/575.1 |
| 2009/0004420 | A1* | 1/2009 | Wheatley | B60R 7/02 428/40.1 |
| 2009/0090833 | A1* | 4/2009 | Daraz | B60R 11/0241 248/316.7 |
| 2009/0117946 | A1* | 5/2009 | Tomasini | H04M 1/04 455/569.2 |
| 2009/0152892 | A1* | 6/2009 | Bohner | B60J 3/0213 296/97.6 |
| 2009/0212189 | A1* | 8/2009 | Carnevali | B25B 5/02 248/346.04 |
| 2009/0284216 | A1* | 11/2009 | Bessa | H02J 7/0044 320/101 |
| 2009/0305748 | A1* | 12/2009 | Piekarz | B60R 11/0241 455/573 |
| 2010/0144404 | A1* | 6/2010 | Cavani | B60R 11/0241 455/575.1 |
| 2011/0069947 | A1* | 3/2011 | Orf | F16M 11/04 396/419 |
| 2012/0080465 | A1* | 4/2012 | Son | B60R 11/02 224/276 |
| 2012/0104195 | A1* | 5/2012 | Da Costa Pito | B60R 11/0241 248/205.1 |
| 2012/0276962 | A1* | 11/2012 | Brzana | H04M 1/04 455/575.1 |
| 2013/0032617 | A1* | 2/2013 | Adelman | A45F 5/00 224/191 |
| 2013/0038280 | A1* | 2/2013 | Boundy | B60R 7/04 320/108 |
| 2013/0257363 | A1* | 10/2013 | Lota | H02J 7/0047 320/108 |
| 2013/0299533 | A1* | 11/2013 | Gronewoller | A45F 5/021 224/191 |
| 2015/0189048 | A1* | 7/2015 | McLaughlin | H04M 1/2155 455/569.1 |

OTHER PUBLICATIONS

Written Opinion for application No. PCT/EP2013/072316, dated Nov. 21, 2013, 11 pages (translated).

* cited by examiner

HOLDER DEVICE FOR PORTABLE ELECTRONIC APPARATUS, INNER STRUCTURE AND VEHICLE INCLUDING SUCH A DEVICE

TECHNICAL FIELD

The invention generally relates to holder devices for portable electronic apparatuses, in particular for a vehicle.

More specifically, according to a first aspect, the invention relates to a holder device for removably receiving, in an upright position, portable electronic apparatuses of various sizes, said holder device being of the type comprising:
- a lower surface suitable so that a lower edge of the electronic apparatus rests on said lower surface in the upright position;
- an upper part suitable for locking an upper edge of the electronic apparatus in the upright position;
- a rear surface suitable so that a back of the electronic apparatus rests against the rear surface in the upright position;
- an electronic device, suitable for cooperating with a complementary electronic device of the electronic apparatus, said electronic device being positioned near the rear surface.

BACKGROUND AND SUMMARY

A holder device of this type is known from KR 2011 0040622. This device can only receive a limited range of portable electronic apparatuses.

In this context, the invention aims to propose a holder device that can receive a wider range of portable electronic apparatuses.

To that end, the invention pertains to a holder device of the aforementioned type, characterized in that the holder device comprises an adjustment mechanism to adjust the separation between the lower surface and the upper part in a main direction, based on the size of the electronic apparatus in that main direction, the adjustment mechanism comprising a moving element that can be moved relative to one of said lower surface and upper part, the other of said lower surface and upper part being connected to the moving element.

Thus, the holder device can receive portable electronic apparatuses whose size in the main direction is extremely varied. This size can for example vary between 100 mm and 160 mm.

The holder device is provided to be arranged inside a vehicle, for example onboard a motor vehicle, such as a car or truck. The holder device is provided to be arranged in a dashboard, or in another inner structure of the vehicle.

The main direction is typically parallel to the rear surface. It is vertical, or forms a smaller angle relative to the vertical direction. Typically, it forms an angle comprised between −30° and +30° relative to the vertical direction.

In the present description, the front, rear, longitudinal and transverse directions are understood relative to the normal movement direction of the vehicle. The horizontal direction is substantially parallel to the rolling plane of the vehicle, and the vertical direction is perpendicular to said rolling plane.

The lower surface is typically horizontal, or has a small incline relative to the horizontal. It is typically perpendicular to the rear surface. The lower surface typically forms an angle comprised between −30° and +30° relative to the horizontal.

The electronic apparatus is typically a mobile telephone, for example a mobile telephone of the "smart phone" type. The portable electronic device may also be a GPS, or an electronic tablet, or any other type of portable electronic device.

The portable electronic apparatuses generally have a parallelepiped shape, with two large faces opposite one another, connected by a thin border. A large front face bears the screen of the portable electronic apparatus. The other face makes up the back of the electronic apparatus. The two large faces are typically rectangular. The main direction corresponds either to the large side of said faces, or the small side of said faces.

The electronic device is a short-range wireless apparatus. It is situated below the rear surface, i.e., on a side of the rear surface opposite the electronic apparatus. For technical reasons related to the design of the electronic device, this device must be situated at a depth below the rear surface smaller than 10 mm, preferably smaller than 5 mm. If the electronic device is situated too deeply below the rear surface, it can no longer cooperate with the complementary electronic device situated inside the electronic apparatus.

The holder device may also have one or more of the features below, considered individually or according to all technically possible combinations.

Advantageously, the upper part is connected to the moving element.

According to one, alternative, it is instead the lower surface that is connected to the moving element.

Advantageously, the adjustment mechanism comprises an elastic member biasing the moving element toward the lower surface or the upper part. Thus, the upper part and the lower surface are continuously biased toward one another. The upper part is thus kept against the upper edge of the electronic apparatus and presses the electronic apparatus toward the lower surface. The holding of the electronic apparatus is thus improved. Furthermore, the adjustment of the separation between the upper part and the lower surface is thus made easier. When the user wishes to position the electronic apparatus on the holder device, he separates the upper part and the lower surface from one another, and inserts the electronic apparatus. He next allows the upper part to come against the upper edge of the electronic apparatus or the lower surface to come back against the lower edge of the electronic apparatus, under the biasing of the elastic member. The separation between the upper part and the lower surface is therefore adjusted automatically.

Advantageously, the adjustment mechanism is situated entirely, in the main direction, either on a side of the electronic device turned toward the upper edge of the electronic apparatus, or on a side of the electronic device turned toward the lower edge of the electronic apparatus.

Thus, in the event the upper part is connected to the moving element, the adjustment mechanism is preferably entirely housed above the electronic device. The adjustment mechanism does not comprise an element interposed between the electronic device and the rear surface. This contributes to the fact that the electronic device can be positioned in the immediate vicinity of the rear surface. In fact, if an element of the adjustment mechanism is inserted between the electronic device and the rear surface, it is necessary to increase the separation between the electronic device and the rear surface to house the adjustment mechanism. This also disrupts the operation of the electronic device.

This aspect of the invention is in particular reflected, for the first embodiment shown in FIGS. 1 to 4, by the fact that the guide rails of the moving element are situated entirely above the electronic device. For the second embodiment of the invention, shown in FIGS. 5 and 6, it is the axis of rotation of the moving element that is situated above the electronic device.

According to one obvious alternative embodiment for one skilled in the art, the adjustment mechanism may alternatively be entirely housed below the electronic device. This arrangement is particularly well suited to cases where the lower part is connected to the moving element.

According to one, alternative, the adjustment mechanism may alternatively be entirely housed below the electronic device. This arrangement is particularly well suited to cases where the lower part is connected to the moving element.

Such a mechanism is simple and inexpensive.

Typically, the adjustment mechanism comprises two guide rails, parallel to one another.

Advantageously, the rail comprises at least one bowed segment, and the moving element is flexible.

This facilitates the arrangement of the main holder device in the structure designed to receive it.

In this case, the moving element is typically a flexible curtain.

The edges of the flexible curtain are engaged in the guide rail(s) and are free to slide inside the rails.

The flexible curtain may be of any suitable type. For example, it is made up of strips parallel to each other. Alternatively, the flexible curtain is made up of a sheet of a flexible material.

Preferably, the rail comprises at least one first segment substantially parallel to the rear surface, and a second segment extending in an inclined direction relative to the rear surface. Thus, the bulk of the adjustment mechanism is limited, for example in the main direction. The second segment forms an angle comprised between 30° and 150° relative to the rear surface, preferably comprised between 45° and 120°, and for example equal to 70°.

Alternatively, the rails can be straight, and the moving element can be a rigid curtain or any other type of rigid element.

Advantageously, the adjustment mechanism comprises a retarder suitable for retarding the movement of the moving element along the rail. This makes it possible to prevent the upper part or the lower surface from colliding with the edge of the electronic apparatus and damaging it if the user abruptly releases the moving element after placing the electronic apparatus in the holder device.

According to a second embodiment, the adjustment mechanism comprises a pivot link designed so that the moving element pivots relative to the lower surface or the upper part.

Thus, the separation between the lower surface and the upper part is adjusted by varying the angle between the moving element and the lower surface.

In that case, the moving element is for example a flap. Alternatively, the moving element is an arm or a finger.

The upper part, or the lower surface, is made up of a surface of the moving element turned toward the lower surface, toward the upper part, respectively. Alternatively, the upper part or the lower surface is attached on the moving element.

The pivot link has an axis substantially parallel to the lower surface and the rear surface.

In that case, the axis is preferably situated, in a direction perpendicular to the rear surface, opposite the electronic apparatus relative to the rear surface.

In other words, the axis is positioned away from the rear surface, for example at a distance comprised between 3 and 10 cm. As indicated above, it is for example offset above the electronic device, on the side of the upper edge of the portable electronic apparatus. As a result, it is possible to arrange the upper part such that the surface of said upper part bearing against the electronic apparatus constantly forms a smaller angle relative to the lower surface. Conversely, it may be offset below the electronic device.

Preferably, the holder device comprises a nonslip element on the lower surface and/or on the upper part, the lower and/or upper edges of the electronic apparatus bearing against the nonslip element in the upright position.

The stability of the electronic apparatus is thus improved. The nonslip element is of any suitable type. For example, this nonslip element is a mat made from an elastic material such as an elastomer.

The nonslip element also contributes to preventing the deterioration of the upper and lower edges of the electronic apparatus that could result from the rubbing of those edges against the lower surface or the upper part.

This nonslip element also contributes to reducing or eliminating noise and vibrations. When there is no nonslip element, these noises and vibrations are created by the upper and lower edges of the electronic apparatus colliding with the lower surface or the upper part.

According to one alternative embodiment, the nonslip element delimits a housing with a shape corresponding to that of the lower and/or upper edge of the electronic apparatus. When the apparatus is in the upright position, the lower and/or upper edges of the electronic apparatus are engaged in said housings.

The electronic apparatus is thus very well held in the holder device.

However, it is necessary to change the nonslip element(s), each time one wishes to use a new type of electronic apparatus. The nonslip elements are therefore specific to each electronic apparatus format.

Advantageously, the adjustment mechanism comprises a device for reversibly locking the moving element in position. This locking device locks the moving element in its current position relative to the lower surface or the upper part. This improves the locking of the electronic apparatus in the holder device.

For example, the locking device comprises a locking member, a motor arranged to move the locking member between a position locking the moving element in position and a position releasing the moving element, and a computer program to control the motor. The locking member may be of any suitable type. For the second embodiment of the invention, the locking member is for example a strip bearing teeth, cooperating in the locking position with a toothed wheel rigidly fastened to the moving element. For the first embodiment of the invention, the locking member is for example a bolt moved linearly by the motor.

In the locking position, the moving element is locked relative to the lower surface or the upper part in its current position. In the released position, the moving element can be moved relative to the lower surface or the upper part.

The motor is provided to move the locking member via a kinematic chain of any suitable type.

The computer is programmed to drive the motor such that the locking member is moved into the locked position in response to different events: the startup of the heat engine of the vehicle, or the startup of the wireless charging unit, or a locking order entered by the user via the electronic apparatus, or a locking order entered by the user via a control member situated at another point of the vehicle.

Likewise, the computer is programmed so that the motor causes the locking member to enter the released position in response to various events: stopping of the heat engine of the vehicle, or stopping of the charging device, or a command entered by the user via the portable electronic apparatus, or a command entered by the user via another control member situated onboard the vehicle.

Other command sequences can be considered.

Typically, the moving element and/or the additional part protrudes, in a direction perpendicular to the rear surface, past a front face of the electronic apparatus opposite the back, and forms a sun visor. The shape of the moving element and/or the upper part is chosen to cast shade on the front face of the electronic apparatus in the upright position.

The visibility of the screen of the electronic apparatus is thus improved. This aspect applies to both embodiments of the invention. In the first embodiment, the upper part is configured as a sun visor. In the second embodiment, the moving element is configured as a sun visor.

Advantageously, the electronic device comprises a wireless charging unit suitable for electrically recharging the electronic apparatus and/or a short-range communication unit with the electronic apparatus.

The wireless charging unit cooperates with a complementary charging device of the electronic apparatus to electrically recharge the battery of the portable electronic apparatus. The communication unit cooperates with a complementary communication unit of the electronic apparatus to send communications coming from or received by the electronic apparatus. This unit is of the NFC (Near Field Communication) type.

According to a second aspect, the invention relates to an inner vehicle structure, comprising a holder device having the above features. The inner structure is for example a dashboard.

According to a third aspect, the invention relates to a vehicle comprising a holder device having the above features, for example a motor vehicle, such as a car or truck.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION OF THE ILLUSTRATED EMBODIMENTS

Figure 1:
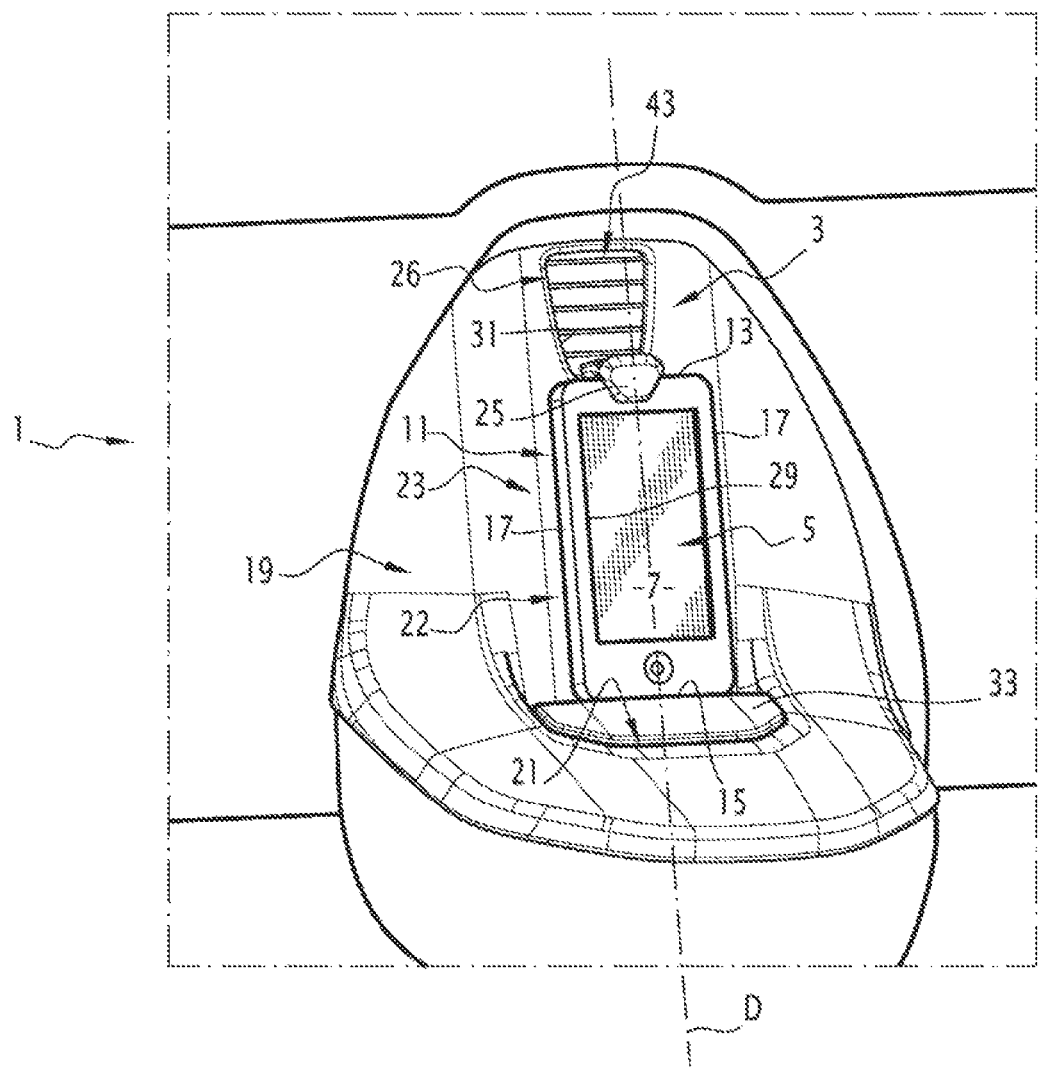
FIG. 1 is a perspective view of part of a vehicle dashboard, equipped with a holder device according to a first embodiment of the invention.

The dashboard 1 shown in FIG. 1 is equipped with a holder device 3 for portable electronic apparatuses 5. The dashboard 1 is installed in the passenger compartment of the vehicle, for example a car or truck.

The holder device 3 is provided to removably receive, in an upright position as shown in FIG. 1, different types of portable electronic apparatuses, having different dimensions. These portable electronic apparatuses are for example portable telephones, GPS units or any other type of portable electronic apparatuses.

As shown in FIG. 1, these portable electronic apparatuses typically have a parallelepiped shape. Each apparatus is delimited by a front face 7, a back 9 (FIG. 3) and a border 11 connecting the front face 7 and the back 9 to one another. The border 11 is generally thin in light of the dimensions of the front face 7 and the back 9. The border 11 defines the edges of the apparatus, and more specifically an upper edge 13, a lower edge 15 and two side edges 17, connecting the upper and lower edges to one another. The upper and lower edges 13 and 15 are parallel to one another. The side edges 17 are parallel to one another and perpendicular to the upper and lower edges 13 and 15. The front face 7 and the back 9 are rectangular, the side edges 17 being longer than the upper and lower edges 13 and 15.

The holder device 3 comprises:
- a façade 19, having a lower surface 21 on which the lower edge 15 of the electronic apparatus rests in the upright position, and a zone 22 delimiting a rear surface 23 on which the back 9 of the electronic apparatus rests in the upright position;
- an upper part 25 locking the upper edge 13 of the electronic apparatus in the upright position;
- a mechanism 26 for adjusting the separation between the lower surface 21 and the upper part 25 in a main direction D shown in FIG. 1, as a function of the size of the electronic apparatus in said main direction D;
- an electronic device 27 (FIG. 4), cooperating with a complementary electronic device 29 of the electronic apparatus.

Figure 4:
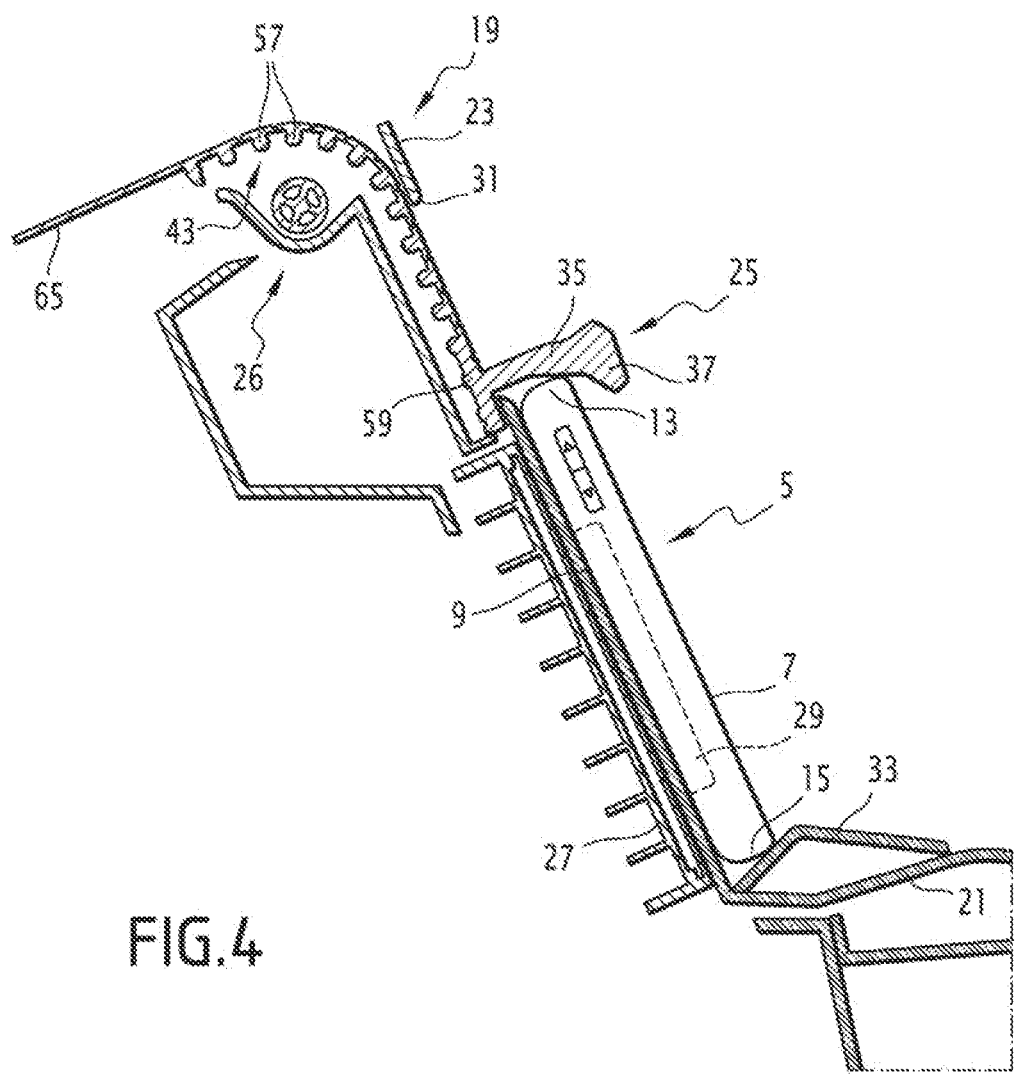
FIG. 4 is a simplified sectional view of the holder device of FIG. 1.

The façade 19 is rigidly fastened on the trim of the dashboard. As shown in FIGS. 1 and 4, it has a window 31 in which the upper part 25 is engaged and which allows the travel of the latter.

The rear surface 23 extends upward and slightly toward the front of the vehicle from the lower surface 21. In the illustrated example embodiment, it forms an angle of approximately 15° relative to the vertical.

The lower surface 21 extends toward the rear and slightly upward from the rear surface 23. In the illustrated example embodiment, it is slightly inclined relative to the horizontal, by approximately 15°. The lower surface 21 is substantially perpendicular to the rear surface 23. The surfaces 21 and 23 are for example substantially planar.

The main direction D is substantially parallel to the rear surface 23, as shown in FIGS. 1 and 4.

The rear surface 21 is covered by a nonslip and noise-proofing mat 33, on which the lower edge 15 of the electronic apparatus rests. The mat is typically made from an elastic material, such as an elastomer.

In the illustrated example, the upper part 25 assumes the form of an L-shaped finger, with a first segment 35 substantially perpendicular to the rear surface, extended by a second segment 37 substantially parallel to the rear surface. The first segment 35 is substantially parallel to the lower surface 21. The second segment 37 points toward the lower surface 21 from the first segment 35. The first segment 35 is provided to bear against the upper edge 13 of the electronic apparatus, such that the second segment 37 prevents the electronic apparatus from tilting backward.

The adjustment mechanism 26 comprises:
- two rails 41, substantially parallel to one another;
- a flexible curtain 43 whereof the side edges 45 are engaged in the rails 41;
- a retarder 47 designed to retard the movement of the curtain 43 along the rails 41;
- an elastic member 49 biasing the curtain 43 toward the lower surface 21.

The two rails 41 are rigidly fastened on a rigid support 50, which in turn is fastened to the façade 19. They are positioned toward the front of the vehicle relative to the façade 19, such that they are not visible for the passengers of the vehicle. The rear surface 23, on the other hand, is situated toward the rear of the façade.

The rails 41 each have a first end segment 51 that is substantially rectilinear and parallel to the main direction, extended by a bowed segment 53, which in turn is extended by a second segment 55 that is substantially rectilinear. The segment 51 of each of the rails is pressed against the zone 22 defining the rear surface 23. The segment 55 is inclined relative to the zone 22 and the rear surface 23. They form an angle of approximately 70° relative to the rear surface. It extends toward the front of the vehicle from the bowed segment 53.

The flexible curtain 43 is engaged in the rails 41 and slides inside those rails. It comprises a plurality of segments 57 parallel to one another, and articulated to one another. The segments 57 are for example connected to one another by film hinges (FIG. 4). The upper part 25 is rigidly fastened to a first end segment 59 of the curtain. The first segment 35 is substantially perpendicular to the first end segment 59. The first end segment 59 constitutes the end of the flexible curtain 43 turned toward the lower surface.

The film hinges connecting the segments 57 to one another are substantially perpendicular to the rails 41.

Figure 3:
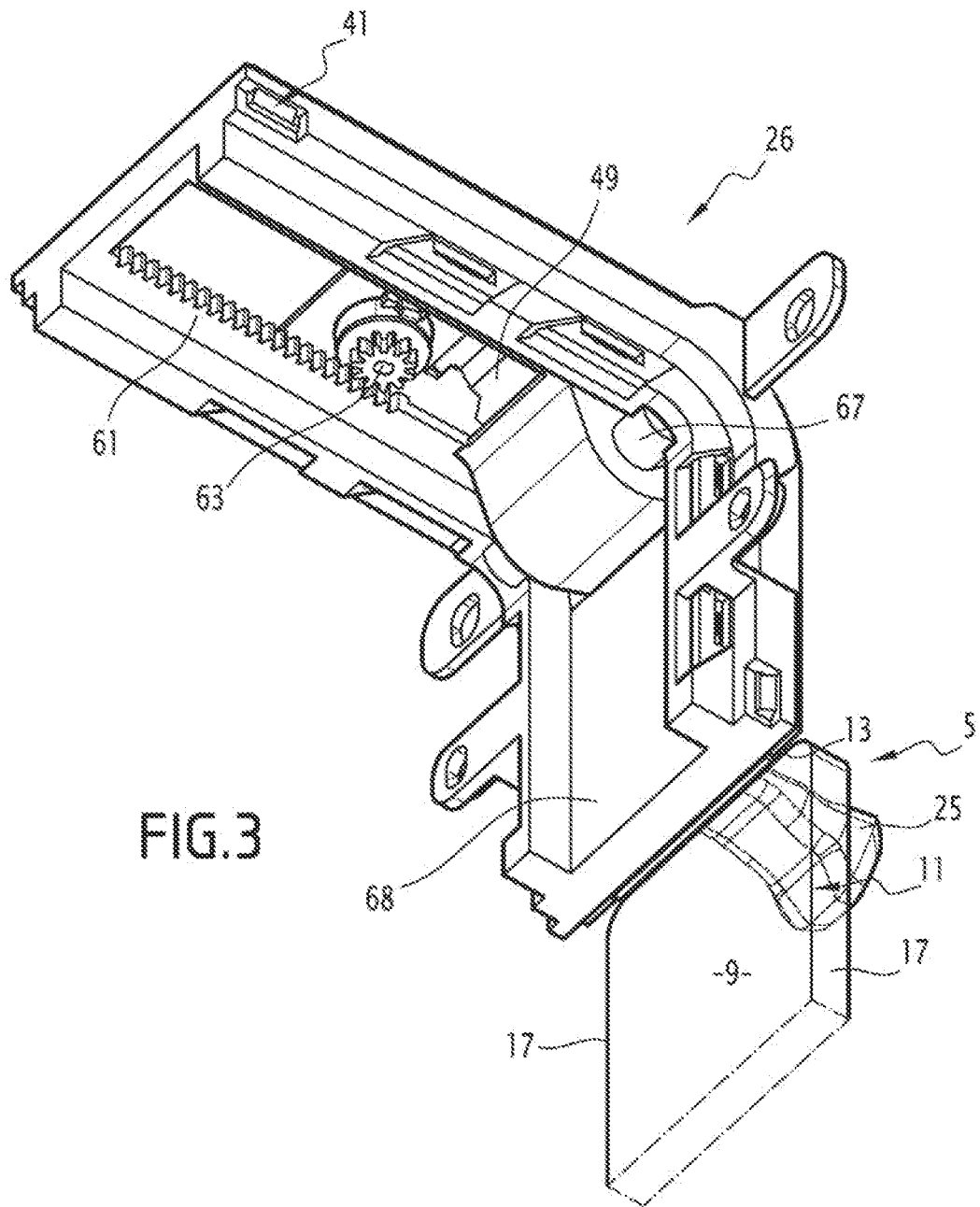
FIG. 3 is a bottom perspective view of the holder device of FIG. 2.

As shown in FIG. 3, the retarder 47 comprises a rack 61 arranged in the rigid support 50, and a toothed wheel 63 secured to a second segment 65 of the flexible curtain 43. The segment 65 defines the end of the flexible curtain opposite the segment 59. The toothed wheel 63 cooperates with the rack 61 when the flexible curtain moves by braking it.

The elastic member 49 is an elastic band, of the spiral spring type, rigidly fastened by a first end to the segment 65 of the flexible curtain, and fastened by a second end on the axis extending substantially horizontally and parallel to the surface 23, the axis being arranged on the rigid support 50.

Figure 2:
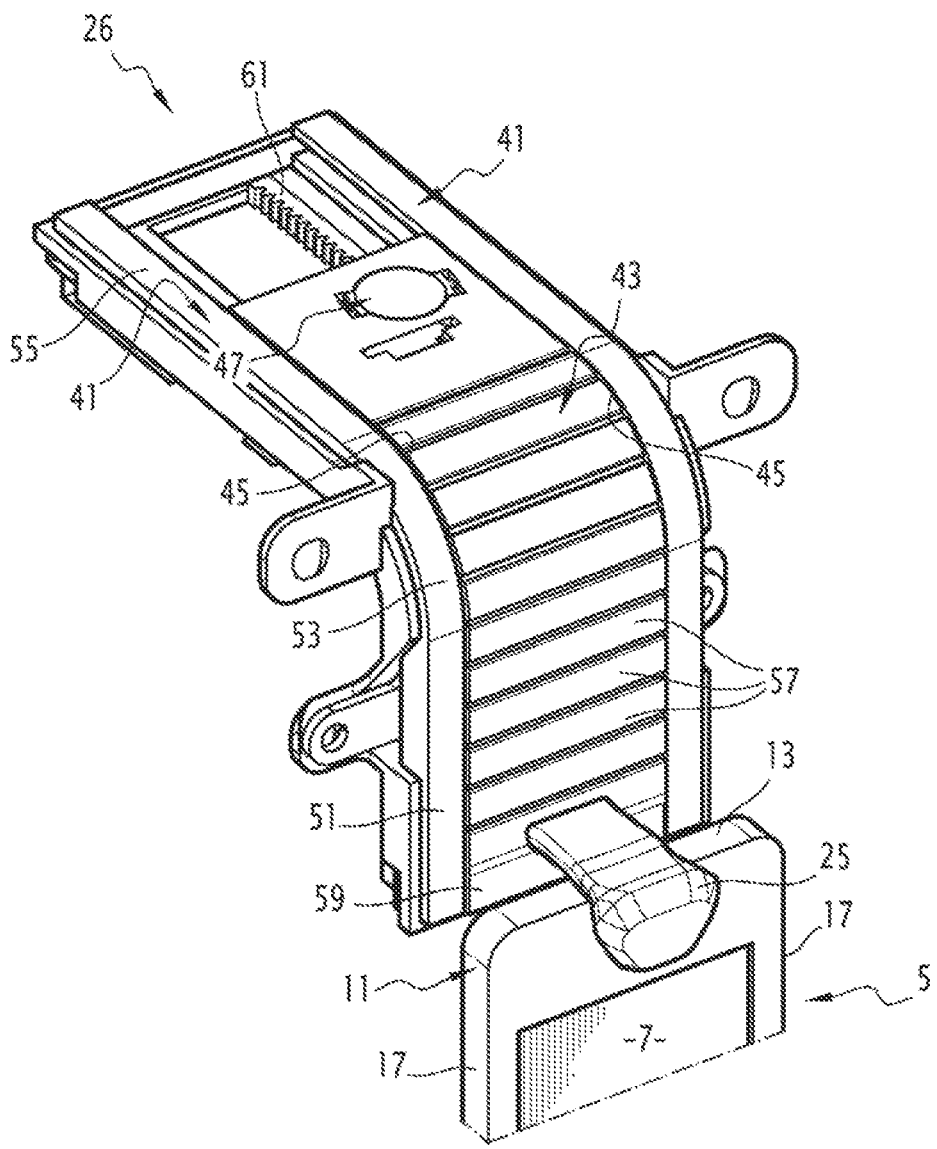
FIG. 2 is a top perspective view of the holder device of FIG. 1.

The adjustment mechanism 26 is entirely situated above the wireless charging unit 27, as shown in FIGS. 2 and 4.

Alternatively, and as shown in FIG. 3, the adjustment mechanism 26 comprises a canvas 68 connecting the two rails 41 and extending substantially over the entire first end segment 51.

The electronic device 27 is a wireless charging unit. The additional electronic device 29 is an additional charging device.

The wireless charging unit 27 is of the known type, and will not described here. It is positioned toward the front of the vehicle relative to the zone 22 of the façade 19. It is situated in the immediate vicinity of the rear surface 23, for example at a depth smaller than 5 mm relative to that rear surface 23. In its upright position, the electronic apparatus is situated toward the rear of the zone 22, with the back 9 bearing against the rear surface 23. The charging unit 27 and the complementary charging device 29 are then in close proximity to one another, and are close enough together to be able to cooperate and recharge the battery of the electronic apparatus.

The operation of the holder device will now be outlined.

An initial situation is considered in which the electronic apparatus is not positioned in the holder device.

In this situation, hereinafter referred to as the "lower position", the flexible curtain 43 is biased by the elastic member 49 toward the lower surface 21, the flexible curtain 43 then covering the entire window 31 and concealing the entire mechanism 26. The travel of the flexible curtain is limited by the length of the rails 41. In one embodiment, the upper part 25 is arranged on a flexible curtain 43 so as to bear against an edge of the window 31. In another embodiment, the upper part 25 is arranged on the flexible curtain 43 so as to extend away from the edge of the window 31, the curtain then abutting against the end of the rails.

When a user wishes to insert a portable electronic apparatus into the holder device, he first moves the flexible curtain relative to the façade 19 either mutually, or with the help of one of the edges of the electronic apparatus, in the main direction D, in the direction of an increasing separation between the upper part 25 and the lower surface 21. He thus causes the flexible curtain 43 to move along the rails, against the return force of the elastic member 49. The user interrupts this movement when the separation between the upper part 13 and the lower surface 21 is sufficient to be able to place the electronic apparatus in the upright position. In this situation, the flexible curtain 43 is in the so-called "high" position. The canvas 68 advantageously makes it possible to conceal the inside of the dashboard and avoid the intrusion of objects when the curtain is in the high position. In the example shown in FIGS. 1 to 4, the apparatus 5 is positioned with its lateral edges 17 parallel to the main direction D, and its upper and lower edges 13 and 15 perpendicular to that direction. It should be noted that, for other alternative embodiments of the holder device, the longer edges could be perpendicular to the main direction and the shorter edges parallel to that direction.

Once the electronic apparatus 5 is in position with its back against the rear surface and its lower edge resting on the lower surface, the user releases the upper part 25. Under the effect of the return force of the elastic member 49, the flexible curtain 43 slides along the rails 41, toward the lower surface 21. This movement is interrupted when the upper part 25 bears against the upper edge 13 of the electronic apparatus. This movement is slowed by the toothed wheel 63, which meshes with the rack 61.

In this position, the wireless charging unit 27 cooperates with the complementary charging device 29 of the electronic apparatus 5, and recharges the battery or keeps the battery of the apparatus charged.

When the user wishes to remove the electronic apparatus 5 either manually, or with the edge of the electronic apparatus in contact with the upper part 25, he performs the same operation sequence, i.e., raising the upper part 25 to a point where he can extricate the electronic apparatus, removing that electronic apparatus, then releasing the upper part 25.

Figure 5:
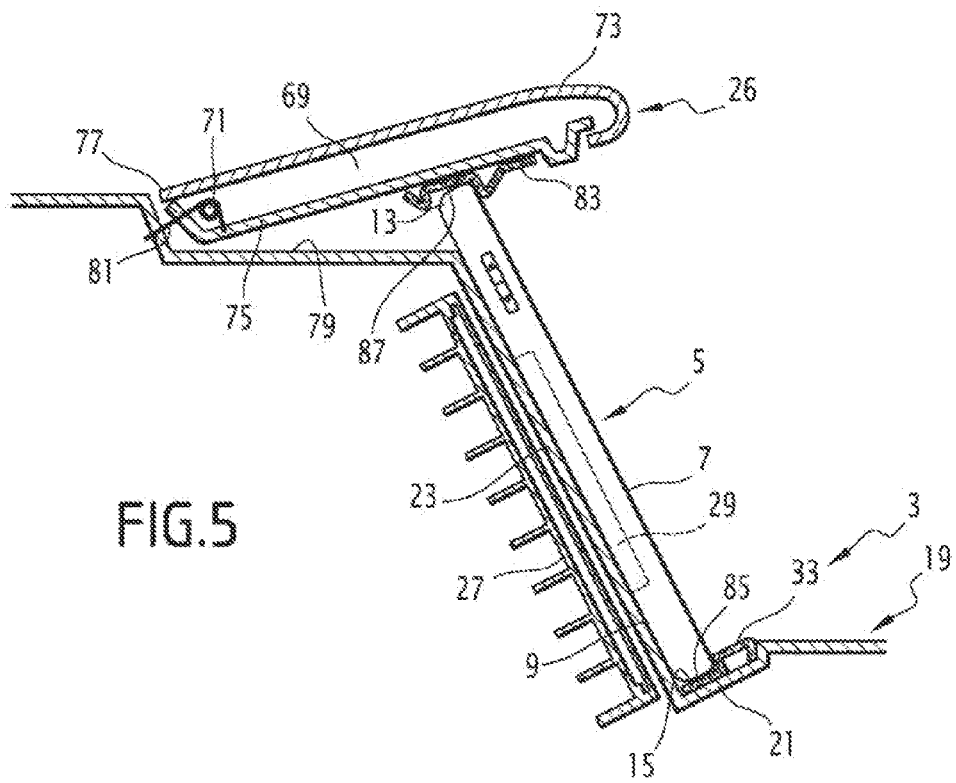
FIG. 5 is a simplified sectional view of a holder device according to a second embodiment of the invention.
Figure 6:
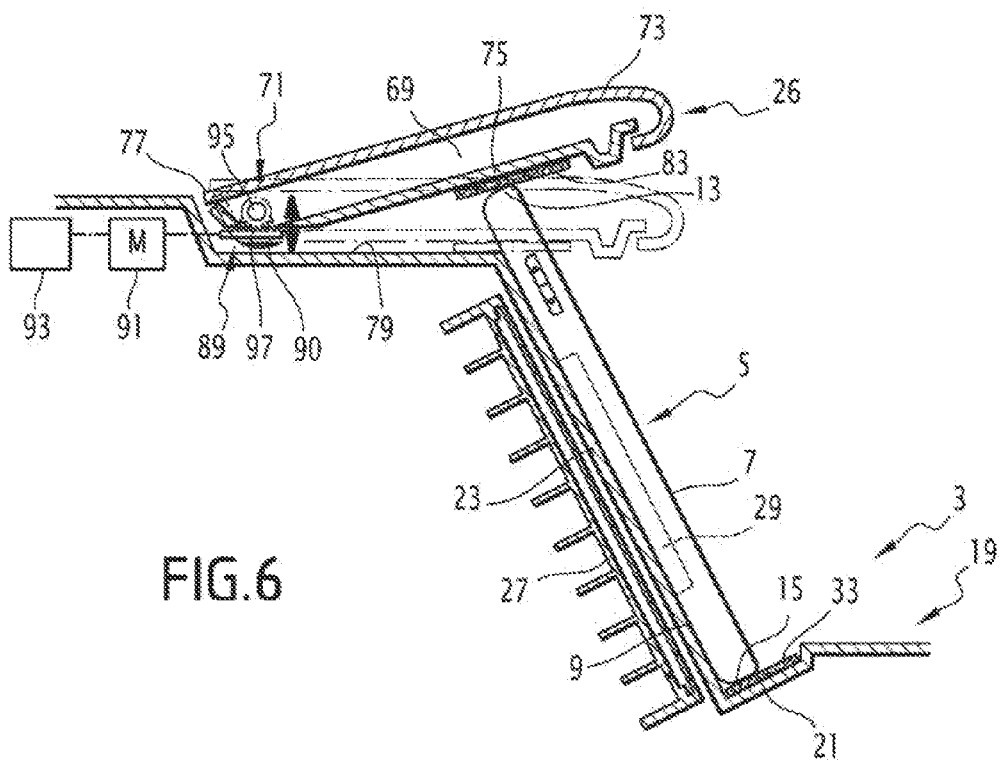
FIG. 6 is a sectional view, similar to that of FIG. 5, of an alternative of the second embodiment of the invention.

A second embodiment of the invention will now be outlined in reference to FIGS. 5 and 6.

Only the differences between this second embodiment and the first will be outlined below.

The adjustment mechanism 26 comprises a flap 69, a pivot link 71 connecting the flap 69 to the façade 19. The flap 69 is a thin part, having a first large face 73 turned upward and a second large face 75 turned downward. The pivot link 71 connects a front part 77 of the flap to the façade 19.

The axis of the pivot link 71 is substantially horizontal and parallel to the rear surface 23. In the illustrated example, it is transverse.

As shown in FIG. 5, the zone 22 of the façade extends opposite the lower surface 21, toward the front, by a horizontal surface 79. The surface 79 is situated above the wireless charging unit 27. The axis of the pivot link 71 extends slightly above the surface 79, near a front end of said surface 79. Thus, this axis, considered in a direction perpendicular to the rear surface, is offset opposite the electronic apparatus relative to the rear surface 23.

The adjustment mechanism 26 also comprises an elastic member 81 biasing the flap 69 in rotation around the pivot link toward the lower surface 21. The spring 81 is for example a torsion spring. It biases the flap 69 in rotation clockwise in the illustration of FIG. 5.

The second large face 75 constitutes the upper part that blocks the upper edge 13 of the electronic apparatus 5 in the upright position.

To that end, the second large face 75 bears a nonslip mat 83, against which the upper edge 13 of the electronic apparatus 5 presses. Said mat is made up of an elastic material, of the elastomer type. The mat 83 is for example flat, as illustrated in FIG. 6. Likewise, the lower surface 21 bears a flat nonslip mat 33.

In one alternative embodiment shown in FIG. 5, the mat 33 and the mat 83 are each configured so as to create a housing 85 and 87, respectively. The housings 85 and 87 have shapes conjuflapd to those of the lower and upper edges 15 and 13, respectively, of the electronic apparatus.

Thus, the mats 33 and 83 are specific to each type of electronic apparatus designed to be received in the holder device. It is necessary to change the mats 33 and 83 if one wishes to go from a first type of electronic apparatus to a second type of electronic apparatus, having dimensions different from those of the first apparatus type.

The flap 69 is situated above the electronic apparatus and protrudes toward the rear of the vehicle relative to the front face 7 of the electronic apparatus. The protruding part serves as a sun visor for the electronic apparatus.

The operation of the holder device described above will now be outlined.

An initial situation is considered in which the electronic apparatus 5 is not positioned in the holder device. In that situation, the flap 69 is biased in rotation by the elastic member 81 around the pivot link, toward the lower surface 21. Its movement is stopped by the horizontal surface 79. When the flap 69 abuts against the surface 79, it is in a substantially horizontal position, as illustrated in FIG. 6. In this position, the flap 69 occupies a position that is incorporated into the general shape of the dashboard. This position advantageously makes it possible to obtain a favorable aesthetic appearance, the flap being in the continuation of the surfaces of the dashboard surrounding it.

When a user wishes to insert an electronic apparatus in the holder device, he lifts the flap 69 manually or using the electronic apparatus by pivoting it against the return force of the elastic member 81. Once the flap 69 is sufficiently separated from the lower surface, he deposits the electronic apparatus in its upright position. As illustrated in FIG. 5, the electronic apparatus rests on the lower surface 21 by its lower edge 15, and by its back 9 against the rear surface 23. Its upper surface 13 protrudes slightly above the horizontal surface 79.

The user then releases the flap 69, which bears against the upper edge 13 by means of the mat 83.

The electronic apparatus 5 is then locked in position.

When the user wishes to remove the electronic apparatus from the holder device, he performs the same operation sequence. More specifically, he once again lifts the flap 69 until it is possible to remove the electronic apparatus. He can then allow the flap 69 to drop, the flap being returned to abut against the horizontal surface 79 by the spring 81. Additionally, a retarder (not shown) can be added so as to retard the return of the flap 69 to abut against the horizontal surface 79.

An alternative of the second embodiment of the invention is shown in FIG. 6. Only the differences with respect to the alternative shown in FIG. 5 will be outlined below.

In the alternative of FIG. 6, the adjustment mechanism comprises a reversible device 89 for locking the flap 69 in position.

The locking device 89 comprises a locking member 90, a motor 91 arranged to move the locking member 90 between a position locking the flap 69 in position and a position releasing the flap 69, and a computer 93 programmed to drive the motor 91.

The locking member 90 is a strip provided to cooperate with a toothed wheel 95 secured to the flap 69. To that end, the strip 90 bears teeth 97. In the locked position, the teeth 97 of the strip 90 are engaged with a toothed wheel 95. The flap 69 is then locked in rotation relative to the façade 19. In the released position, the strip 90 is separated from the toothed wheel 95, such that its teeth 97 are no longer engaged with the toothed wheel 95. The flap 69 is thus free to rotate relative to the façade 19 around the pivot link.

The computer 93 is programmed to drive the motor such that the latter moves the strip between its locked and released positions in response to predetermined events corresponding to life situations of the vehicle and/or its occupants.

In this example embodiment, the electronic apparatus is connected to the computer 93 by a wired or wireless link.

The invention claimed is:

1. A holder device for removably receiving, in an upright position, portable electronic apparatuses of various sizes, said holder device comprising:
   - a lower surface suitable so that a lower edge of the electronic apparatus rests on said lower surface in the upright position;
   - an upper part suitable for locking an upper edge of the electronic apparatus in the upright position;
   - a rear surface suitable so that a back of the electronic apparatus rests against the rear surface in the upright position;
   - an electronic device, suitable for cooperating with a complementary electronic device of the electronic apparatus, said electronic device being positioned near the rear surface, wherein said electronic device comprises a wireless charging unit suitable for electrically recharging the electronic apparatus and/or a short-range communication unit with the electronic apparatus;
   - wherein the holder device comprises an adjustment mechanism to adjust the separation between the lower surface and the upper part in a main direction, based on the size of the electronic apparatus in that main direction, the adjustment mechanism comprising a moving element that can be moved relative to one of said lower surface and upper part, the other of said lower surface and upper part being connected to the moving element, and wherein the adjustment mechanism is situated entirely, in the main direction, either on a side of the electronic device turned toward the upper edge of the electronic apparatus, or on a side of the electronic device turned toward the lower edge of the electronic apparatus.

2. The device according to claim 1, wherein the upper part is connected to the moving element.

3. The device according to claim 1, wherein the adjustment mechanism comprises an elastic member biasing the moving element toward the lower surface or the upper part.

4. The device according to claim 1, wherein the adjustment mechanism comprises at least one guide rail guiding the movement of the moving element relative to the lower surface or the upper part.

5. The device according to claim 4, wherein the rail comprises at least one bowed segment, and the moving element is flexible.

6. The device according to claim 5, wherein the moving element is a flexible curtain.

7. The device according to claim 4, wherein the rail comprises at least one first segment substantially parallel to the rear surface, and a second segment extending in an inclined direction relative to the rear surface.

8. The device according to claim 4, wherein the adjustment mechanism comprises a retarder suitable for retarding the movement of the moving element along the rail.

9. The device according to claim 1, wherein the adjustment mechanism comprises a pivot link designed so that the moving element pivots relative to the lower surface or the upper part.

10. The device according to claim 9, wherein the pivot link comprises an axis which, in a direction perpendicular to the rear surface, is offset opposite the electronic apparatus relative to the rear surface.

11. The device according to claim 1, wherein it comprises a nonslip element on the lower surface and/or on the upper part, the lower and/or upper edges of the electronic apparatus bearing against the nonslip element in the upright position.

12. The device according to claim 11, wherein the nonslip element delimits a housing with a shape corresponding to that of the lower and/or upper edge of the electronic apparatus.

13. The device according to claim 1, wherein the adjustment mechanism comprises a device for reversibly locking the moving element in position.

14. The device according to claim 1, wherein the moving element and/or the additional part protrudes, in a direction perpendicular to the rear surface, past a front face of the electronic apparatus opposite the back, and forms a sun visor.

15. A holder device for removably receiving, in an upright position, portable electronic apparatuses of various sizes, said holder device comprising:
    a lower surface suitable so that a lower edge of the electronic apparatus rests on said lower surface in the upright position;
    an upper part suitable for locking an upper edge of the electronic apparatus in the upright position;
    a rear surface suitable so that a back of the electronic apparatus rests against the rear surface in the upright position;
    an electronic device, suitable for cooperating with a complementary electronic device of the electronic apparatus, said electronic device being positioned near the rear surface;
    wherein the holder device comprises an adjustment mechanism to adjust the separation between the lower surface and the upper part in a main direction, based on the size of the electronic apparatus in that main direction, the adjustment mechanism comprising a moving element that can be moved relative to one of said lower surface and upper part, the other of said lower surface and upper part being connected to the moving element, the adjustment mechanism comprising a device for reversibly locking the moving element in position, and wherein the locking device comprises a locking member, a motor arranged to move the locking member between a position locking the moving element in position and a position releasing the moving element, and a computer programmed to drive the motor.

16. The device according to claim 15, wherein the adjustment mechanism is situated entirely, in the main direction, either on a side of the electronic device turned toward the upper edge of the electronic apparatus, or on a side of the electronic device turned toward the lower edge of the electronic apparatus.

17. The device according to claim 15, wherein the electronic device comprises a wireless charging unit suitable for electrically recharging the electronic apparatus and/or a short-range communication unit with the electronic apparatus.

* * * * *